United States Patent
Almeida et al.

(10) Patent No.: US 11,727,460 B2
(45) Date of Patent: *Aug. 15, 2023

(54) SYSTEMS, METHODS, AND NON-TRANSITORY COMPUTER-READABLE STORAGE MEDIUM FOR OBTAINING PRODUCT INFORMATION VIA A CONVERSATIONAL USER INTERFACE

(71) Applicant: Kinaxis Inc., Ottawa (CA)

(72) Inventors: Marcio Oliveira Almeida, Ottawa (CA); Zhen Lin, Ottawa (CA); Casey Bigelow, Ottawa (CA); Liam Meade, Ottawa (CA); Akshatha Mummigatti, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/944,262

(22) Filed: Jul. 31, 2020

(65) Prior Publication Data
US 2022/0036424 A1 Feb. 3, 2022

(51) Int. Cl.
*G06Q 30/00* (2023.01)
*G06Q 30/0601* (2023.01)
*G06F 16/9032* (2019.01)

(52) U.S. Cl.
CPC ... *G06Q 30/0627* (2013.01); *G06F 16/90332* (2019.01); *G06Q 30/0635* (2013.01)

(58) Field of Classification Search
CPC ............ G06Q 30/0627; G06Q 30/0635; G06F 16/90332
USPC ..................................................... 705/26.63
See application file for complete search history.

(56) References Cited

U.S. PATENT DOCUMENTS

| | | | |
|---|---|---|---|
| 2007/0198267 A1* | 8/2007 | Jones | H04M 3/4936 704/257 |
| 2007/0255697 A1 | 11/2007 | Seeman | |
| 2013/0304758 A1* | 11/2013 | Gruber | G06F 16/248 707/769 |
| 2015/0378985 A1 | 12/2015 | Prasad et al. | |
| 2017/0344887 A1* | 11/2017 | Ahmed | H04L 67/02 |
| 2018/0129188 A1* | 5/2018 | Jacobs, II | G06F 30/00 |
| 2019/0050496 A1* | 2/2019 | Jalan | G06F 16/90332 |
| 2019/0130310 A1* | 5/2019 | Madhava Rao | G06F 11/3476 |

(Continued)

OTHER PUBLICATIONS

Pegasystems launches pega intelligent virtual assistant—evolving bots from simple chats to dynamic engagements: New AI-powered bot provides customers and employees with smart digital assistants from any conversational interface—from facebook messenger to alexa and beyond. (Apr. 18, 2017) (Year: 2017).*

(Continued)

*Primary Examiner* — Arielle E Weiner
(74) *Attorney, Agent, or Firm* — Borden Ladner Gervais LLP; Curtis Behmann

(57) ABSTRACT

Systems and methods for obtaining product information via a conversational user interface. The communication channel receives communication from a user, the intent and entities of which are deduced by the NLP. These are communicated by the fulfillment API to the knowledge engine which retrieves information that fulfills the intent. The information is communicated to the fulfillment API, which converts the intent into a response, which in turn is forwarded by the NLP to the communication channel, and back to the user.

15 Claims, 15 Drawing Sheets

(56) References Cited

U.S. PATENT DOCUMENTS

| | | | |
|---|---|---|---|
| 2019/0258738 A1 | 8/2019 | Vijayakar et al. | |
| 2020/0007474 A1* | 1/2020 | Zhang | G09B 7/02 |
| 2020/0251111 A1* | 8/2020 | Temkin | G06F 16/2423 |
| 2020/0335187 A1* | 10/2020 | Lefkofsky | G16H 40/67 |
| 2020/0387550 A1* | 12/2020 | Cappetta | G06F 16/9538 |
| 2021/0019309 A1* | 1/2021 | Yadav | G06F 16/245 |
| 2021/0397796 A1* | 12/2021 | Dounis | G06F 40/289 |

OTHER PUBLICATIONS

Ref U Continued: NASDAQ OMX's News Release Distribution Channel Retrieved from https://www.proquest.com/wire-feeds/pegasystems-launches-pega-intelligent-virtual/docview/1888922320/se-2 (Year: 2017).*

* cited by examiner

| Speaker | Conversational Turn | Notes |
|---|---|---|
| User | Ok Google, talk to Kinaxis Brain™ | |
| Assistant | Alright, here's Kinaxis Brain™ | |
| Kinaxis Brain™ | Hi, I am Kinaxis Brain™. How can I assist you? | |
| User | What is Independent Demand? | |
| Kinaxis Brain™ | Independent demand is demand coming directly from the customer.<br><br>Would you like to know about anything else? | |
| User | I'm done for now. | |
| Kinaxis Brain™ | Ok. Have a nice day. | |

FIG. 7

| Speaker | Conversational Turn | Notes |
|---|---|---|
| User | Ok Google,™ talk to Kinaxis Brain™ | |
| Assistant | Alright, here's Kinaxis Brain.™ | |
| Kinaxis Brain™ | Hi, I am Kinaxis Brain.™ How can I assist you? | |
| User | How can I create a collaboration? | |
| Kinaxis Brain™ | Here is the steps to create a collaboration: First, click the "New Collaboration" button on the Kinaxis toolbar, and then click "Start a Collaboration."<br><br>Can I assist you with anything else? | |
| User | I'm done for now. | |
| Kinaxis Brain™ | Ok. Have a nice day. | |

FIG. 9

| Speaker | Conversational Turn | Notes |
|---|---|---|
| User | Ok Google, talk to Kinaxis Brain™ | |
| Assistant | Alright, here's Kinaxis Brain™ | |
| Kinaxis Brain™ | Hi, I am Kinaxis Brain™. How can I assist you? | |
| User | Can you help me viewing my data in charts? | |
| Kinaxis Brain™ | Sure. It is possible to display data in a variety of charts in dashboards, workbooks, and scorecards. Which one would you like to know about? | |
| User | I want to view data in a dashboard. | |
| Kinaxis Brain™ | Charts in dashboards display in components called widgets. Typically, multiple widgets display on each dashboard tab and most widgets display data as a chart. Would you like to know more about widgets or viewing data in Dashboards? | The assistant displays images of a Dashboard and Widgets. |
| User | I would like to learn about viewing data in Dashboards | |
| Kinaxis Brain™ | Dashboards can display widgets on multiple tabs, with widgets grouped by type, theme, or use on each tab. You can drill to more detailed data on a dashboard by clicking a widget to open another resource, such as a Treemap or source worksheet, where you can view and correct the root cause of a problem area. On a dashboard you can Drill from a widget, and control how it displays data by adjusting Data Settings in Dashboards. Would you like to know more about these actions? | The assistant displays images of a Treemap widget and Source Worksheet. |
| User | I would like to Drill from a widget | |
| Kinaxis Brain™ | You can drill from a chart widgets by clicking on a chart element such as a line marker in a line chart or a needle in a gauge chart. If drilling is defined for that chart widget, the pointer changes to a hand when you hover over a charting element. | The assistant displays images showing the drilling examples. |
| Kinaxis Brain™ | Would you like to know more about widgets that you can drill such as worksheet data, chart or Treemap? | |
| User | No, thank you. I am ok for now. | |
| Kinaxis Brain™ | Great. Have a great day. | |

FIG. 13

SYSTEMS, METHODS, AND NON-TRANSITORY COMPUTER-READABLE STORAGE MEDIUM FOR OBTAINING PRODUCT INFORMATION VIA A CONVERSATIONAL USER INTERFACE

BACKGROUND

Users of software-as-a-service (SAAS) products often have questions about the product they are using. Often, the user is referred to a product manual, which is large. The user must search through the manual to find section(s) relevant to the user's questions. If a user wants to understand how to use certain aspects of the product, or needs help troubleshooting, s/he must wade through product documentation to find an appropriate answer. This is time-consuming, leading to a loss in efficiency.

There is a need for an intelligent non-human (i.e. virtual) agent that can answer questions posed by users, as well as guide users through more complicated processes. Furthermore, this agent should be available through a variety of communication channels, such as a browser chatbot, Google™ Assistant (voice), SMS, etc. The virtual agent should be able to process oral, written and image-based communications provided by a user, and provide answers and/or guidance in real time.

BRIEF SUMMARY

Disclosed herein are methods and systems that build over time, a body of related knowledge to answer questions and/or provide recommendations via a user interface (UI). The methods and systems relate to the use of a conversational user interface for obtaining information about a SAAS product and related product concepts. The methods and systems provide answers to general and specific questions about the product. In some embodiments, they provide step-by-step instructions on how to perform different tasks related to the SAAS product.

In some embodiments, the systems and methods use machine learning to build a knowledge base from SAAS product documentation, data models, etc. The systems and methods continuously learn from questions and interactions with users to improve responses, along with the knowledge base. In some embodiments, the systems and methods also apply analytics to identify frequent pain points experienced by users.

In one aspect, there is provided a computer-implemented method for obtaining knowledge related to a product, the method comprising: receiving, by a communication channel, a communication from a user; deducing, by a natural language processor, an intent and one or more entities of the communication; communicating, by a fulfillment API, the intent and the one or more entities to a knowledge engine; preparing, by the knowledge engine, one or more queries to fulfill the intent; retrieving, by the knowledge engine, information that fulfills the intent; communicating, by the knowledge engine, the information that fulfills the intent to the fulfillment API; converting, by the fulfillment API, the information that fulfils the intent into a response; forwarding, by the natural language processor, the response from the fulfilment API to the communication channel; and communicating, by the communication channel, the response to the user.

In some embodiments of the computer-implemented method, the knowledge engine comprises a query engine and a knowledge base providing information about the product, the method further comprising: receiving, by the query engine, the intent and entities from the fulfillment API; composing, by the query engine, a set of requests related to the intent and the entities to send to the knowledge base; retrieving, by the query engine, one or more units of information from the knowledge base; and composing, by the query engine, a second response based on the one or more units of information. The knowledge base can comprise structured data, semi-structured data, unstructured data and communication with one or more external data sources. Furthermore, the one or more units of information can be at least one of an image, a video, a text and a document.

In some embodiments of the computer-implemented method, the user seeks a set of instructions, and the method further comprises: preparing, by the knowledge engine, a query for the set of instructions; retrieving, by the knowledge engine, information about one or more actions related to the set of instructions; assembling, by the knowledge engine, a sequence of steps to execute the one or more actions; and communicating, by the knowledge engine, the sequence of steps to the fulfilment API.

In some embodiments of the computer-implemented method, the method further comprises: deducing, by the natural language processor, a context associated with the intent and one or more entities of the communication; preparing, by the knowledge engine, a query for searching one or more solutions for an issue related to the context; retrieving, by the knowledge engine, information matching the context; and communicating, by the knowledge engine, the information matching the context to the fulfilment API.

In some embodiments of the computer-implemented method, the method further comprises: deducing, by the natural language processor, a context associated with the intent and one or more entities of the communication; preparing, by the knowledge engine, a query for providing the user, information about a topic; retrieving, by the knowledge engine, information matching the context; following, by the knowledge engine, a learning workflow related to the topic; and communicating, by the knowledge engine, the information matching the context to the fulfilment API. In some embodiments, the communication is at least one of textual, verbal and image-based.

In another aspect, there is provided a system for obtaining knowledge related to a product, the system comprising: a processor; and a memory storing instructions that, when executed by the processor, configure the system to: receive, by a communication channel, a communication from a user; deduce, by a natural language processor, an intent and one or more entities of the communication; communicate, by a fulfillment API, the intent and the one or more entities to a knowledge engine; prepare, by the knowledge engine, one or more queries to fulfill the intent; retrieve, by the knowledge engine, information that fulfills the intent; communicate, by the knowledge engine, the information that fulfills the intent to the fulfillment API; convert, by the fulfillment API, the information that fulfils the intent into a response; forward, by the natural language processor, the response from the fulfilment API to the communication channel; and communicate, by the communication channel, the response to the user.

In some embodiments of the system, the knowledge engine comprises a query engine and a knowledge base providing information about the product, and the instructions further configure the system to: receive, by the query engine, the intent and entities from the fulfillment API; compose, by the query engine, a set of requests related to the intent and the entities to send to the knowledge base;

retrieve, by the query engine, one or more units of information from the knowledge base; and compose, by the query engine, a second response based on the one or more units of information. The knowledge base can comprise structured data, semi-structured data, unstructured data and communication with one or more external data sources. Furthermore, the one or more units of information can be at least one of an image, a video, a text and a document.

In some embodiments of the system, the user seeks a set of instructions, and the instructions stored in memory further configure the system to: prepare, by the knowledge engine, a query for the set of instructions; retrieve, by the knowledge engine, information about one or more actions related to the set of instructions; assemble, by the knowledge engine, a sequence of steps to execute the one or more actions; and communicate, by the knowledge engine, the sequence of steps to the fulfilment API.

In some embodiments of the system, the instructions further configure the system to: deduce, by the natural language processor, a context associated with the intent and one or more entities of the communication; prepare, by the knowledge engine, a query for searching one or more solutions for an issue related to the context; retrieve, by the knowledge engine, information matching the context; and communicate, by the knowledge engine, the information matching the context to the fulfilment API.

In some embodiments of the system, the instructions further configure the system to: deduce, by the natural language processor, a context associated with the intent and one or more entities of the communication; prepare, by the knowledge engine, a query for providing the user, information about a topic; retrieve, by the knowledge engine, information matching the context; follow, by the knowledge engine, a learning workflow related to the topic; and communicate, by the knowledge engine, the information matching the context to the fulfilment API. In some embodiments, the communication is at least one of textual, verbal and image-based.

In yet another aspect, there is provided a non-transitory computer-readable storage medium for obtaining knowledge related to a product, the computer-readable storage medium including instructions that when executed by a computer, configure the computer to: receive, by a communication channel, a communication from a user; deduce, by a natural language processor, an intent and one or more entities of the communication; communicate, by a fulfillment API, the intent and the one or more entities to a knowledge engine; prepare, by the knowledge engine, one or more queries to fulfill the intent; retrieve, by the knowledge engine, information that fulfills the intent; communicate, by the knowledge engine, the information that fulfills the intent to the fulfillment API; convert, by the fulfillment API, the information that fulfils the intent into a response; forward, by the natural language processor, the response from the fulfilment API to the communication channel; and communicate, by the communication channel, the response to the user.

In some embodiments of the non-transitory computer-readable storage medium, the knowledge engine comprises a query engine and a knowledge base providing information about the product, and the instructions further configure the computer to: receive, by the query engine, the intent and entities from the fulfillment API; compose, by the query engine, a set of requests related to the intent and the entities to send to the knowledge base; retrieve, by the query engine, one or more units of information from the knowledge base; and compose, by the query engine, a second response based on the one or more units of information. The knowledge base can comprise structured data, semi-structured data, unstructured data and communication with one or more external data sources. Furthermore, the one or more units of information can be at least one of an image, a video, a text and a document.

In some embodiments of the non-transitory computer-readable storage medium, the user seeks a set of instructions, and the instructions included in the non-transitory computer-readable storage medium further configure the computer to: prepare, by the knowledge engine, a query for the set of instructions; retrieve, by the knowledge engine, information about one or more actions related to the set of instructions; assemble, by the knowledge engine, a sequence of steps to execute the one or more actions; and communicate, by the knowledge engine, the sequence of steps to the fulfilment API.

In some embodiments of the non-transitory computer-readable storage medium, the instructions further configure the computer to: deduce, by the natural language processor, a context associated with the intent and one or more entities of the communication; prepare, by the knowledge engine, a query for searching one or more solutions for an issue related to the context; retrieve, by the knowledge engine, information matching the context; and communicate, by the knowledge engine, the information matching the context to the fulfilment API.

In some embodiments of the non-transitory computer-readable storage medium, the instructions further configure the computer to: deduce, by the natural language processor, a context associated with the intent and one or more entities of the communication; prepare, by the knowledge engine, a query for providing the user, information about a topic; retrieve, by the knowledge engine, information matching the context; follow, by the knowledge engine, a learning workflow related to the topic; and communicate, by the knowledge engine, the information matching the context to the fulfilment API. In some embodiments, the communication is at least one of textual, verbal and image-based.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates a conversation in accordance with the embodiment shown in FIG. 6.

FIG. 9 illustrates a conversation in accordance with the embodiment shown in FIG. 8.

FIG. 13 illustrates a conversation in accordance with the embodiment shown in FIG. 12.

DETAILED DESCRIPTION

Figure 1:
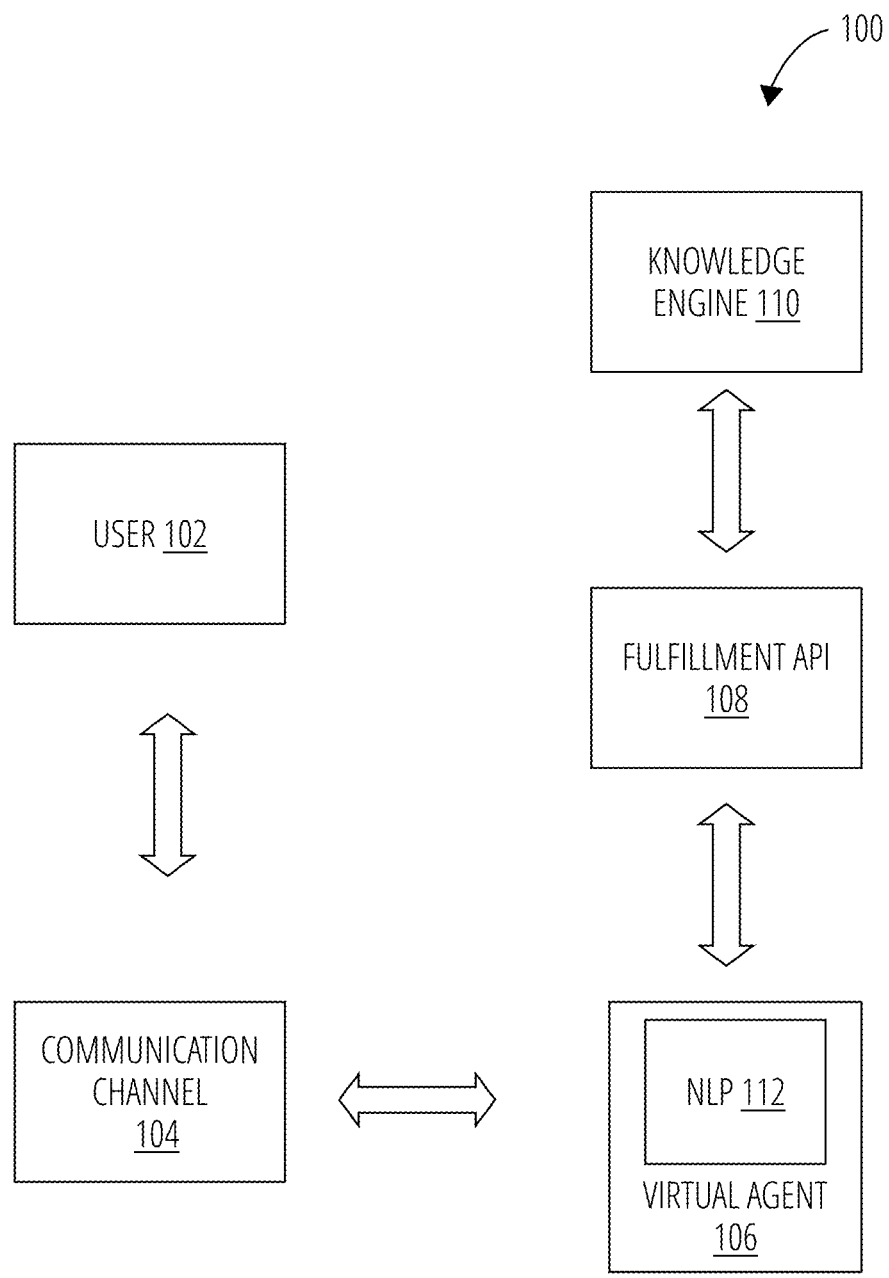
FIG. 1 illustrates an overview 100 in accordance with one embodiment.

FIG. 1 illustrates an overview 100 in accordance with one embodiment.

In the block overview 100, a user 102 refers to an individual who is requesting information or instructions related to a SAAS (not shown).

User 102 conveys a message to communication channel 104. Communication channel 104, refers to a connection between user 102 and virtual agent 106 which comprises a Natural Language Processor NLP 112. The communication channel 104 takes communication from the user and converts it into a form that can be processed by NLP 112. For example, if the user provides a verbal communication, communication channel 104 converts the verbal form to text; the textual form is processed by the NLP 112. If the user provides a textual communication, communication channel 104 simply passes on the text to the virtual agent 106. In some embodiments, the communication channel 104 can include a communications application.

The communication channel 104 also returns information (i.e. a response) to user 102. The response can be verbal, written or image-based. In some embodiments, the response can comprise a link to a video.

The type of communication channel 104 may depend on the service that is used to build the virtual agent 106, For example, if DialogFlow™ (from Google™) is used to for both the virtual agent 106 and NLP 112, the communication channel 104 can be Google™ Assistant (Google™ Home, Mini, Android™ and iPhone™ mobiles) and others. In another example, when Microsoft™ Bot Service is used for the virtual agent 106 and Microsoft™ Luis used for the NLP 112, the channels can be Alexa™ Microsoft Cortana™, Facebook Messenger™ Kik™, and Slack™, as well as several others.

Virtual agent 106 receives input from user 102 through the communication channel 104; the NLP 112 deduces an intent, and any entities associated with the intent. The NLP 112 handles a conversation with a user and translates the end-user text into structured data, such that backend services can understand. That is, the NLP 112 translates the conversation into intents and entities. The virtual agent 106 and NLP 112 are trained beforehand, in order to map intents and entities. Training is part of a standard procedure, and it is customized for a particular domain or application. Training comprises providing the NLP 112 with sample phrases, definition of intents and entities, and one or more workflows, each of which include context. Example of an NLP service that can be used include Google DialogFlow™; Microsoft™ Bot Service in combination with Microsoft Luis™; and Amazon Lex™.

The training of the NLP 112 in the virtual agent 106 includes inputting a plurality of phrases for a given intent. Different sets of phrases are used with respect to different intents. Each intent is customized for a particular domain. Furthermore, the NLP 112 is trained to extract one or more parameters from a phrase; parameters can be grouped into different types, or entities. Furthermore, the NLP 112 can be trained to include context about a dialogue; the dialogue can be linear or non-linear.

The fulfillment API 108 subsequently communicates data associated with the intent and entities to a knowledge engine 110, which receives the intent and obtains the information to fulfill the intent. Once the fulfillment API 108 receives the information from the knowledge engine 110, the fulfillment API 108 returns the retrieved information to the virtual agent 106.

The fulfillment API 108 is constructed according to methods known in the art. In some embodiments, a webhook is built using any programming language to build an HTTP Web API, such as Python, Java, C#, etc.

Knowledge engine 110 then supplies the information to the fulfillment API 108, which converts the information to a conversational form that is sent via the virtual agent 106 back to the communication channel 104 and ultimately, back to user 102.

Figure 2:
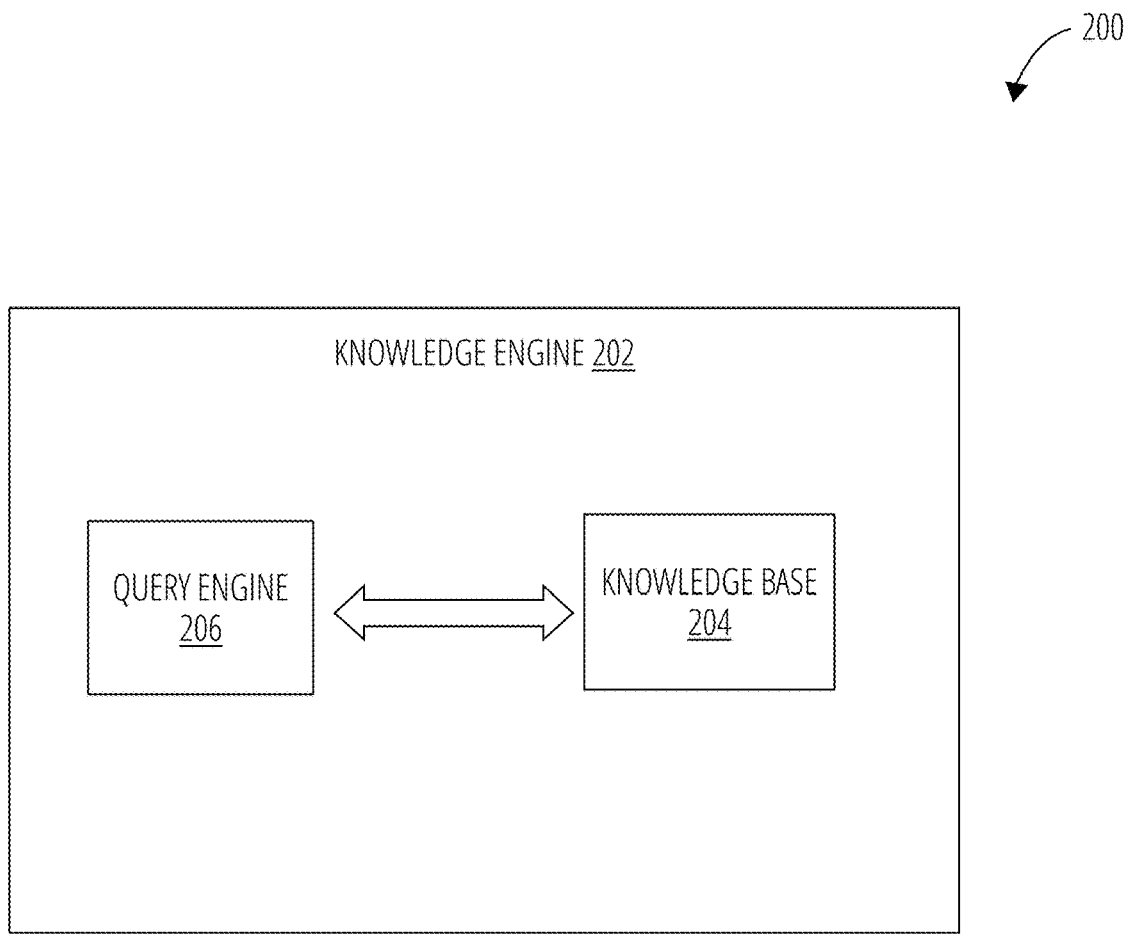
FIG. 2 illustrates a block diagram of a knowledge engine in accordance with one embodiment.

FIG. 2 illustrates a block diagram 200 of a knowledge engine 202 in accordance with one embodiment. Knowledge engine 200 comprises a query engine 206 and a knowledge base 204.

The query engine 206 interprets the intent (provided by the fulfillment API 108 in FIG. 1) and queries the knowledge base 204 for information. The query engine 206 structures that information in a way that the fulfillment API 108 can send back to the communication channel 104.

Knowledge base 204 refers to technology that stores complex structure and unstructured information about software. That is, knowledge base 204 is where knowledge (that is, data) is stored. Such information can include, for example, manuals, data models, a repository of frequent asked questions (FAQs) and concepts related to the product.

Further details of the query engine 206 and knowledge base 204 are discussed below.

Figure 3:
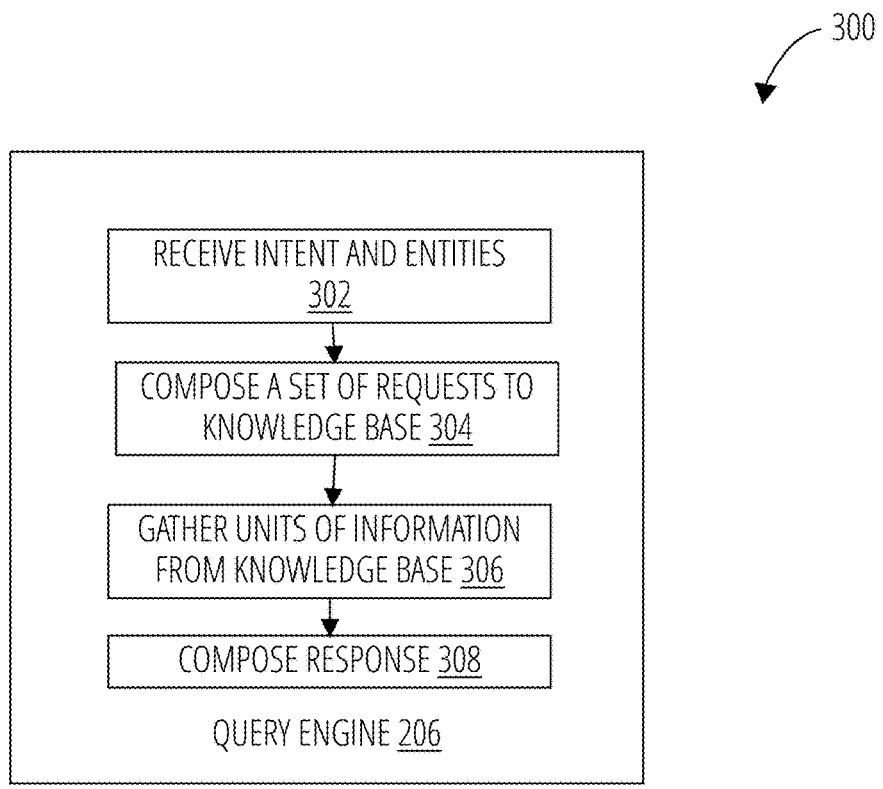
FIG. 3 illustrates a flowchart related to an operation of a query engine in accordance with one embodiment.

FIG. 3 illustrates a flowchart 300 related to an operation of a query engine 206 in accordance with one embodiment.

According to the flowchart 300, at step 302, query engine 206 receives an intent and entities related to the intent. Entities can be, for example, details that refine the intent. An example of an intent and a related entity is described from the following question from a user: "what is the weather tomorrow?". The intent is to obtain the weather, while a related entity is the date, as specified by the word "tomorrow". Another example of an intent is from the following question about an exemplary platform: "how do I get a projection for a part for next year?", in which the intent is instructions or steps on obtaining certain information that the product can provide. As shown below, this type of information can be contained in a user's guide for the product. Often times, user guides are voluminous and require time to find particular information. In the methods and systems disclosed herein, answers to specific questions are found and relayed to a user almost instantaneously. Note that a user cannot ask the question: "what is the projection for a part next year", since this requires execution of the SAAS product to obtain the answer (i.e. next year's projection).

At step 304, query engine 206 composes a set of requests (related to the intent and entities), to retrieve units of information from the knowledge base (not shown) that are needed to fulfill the intent. These units can be different types of data; non-limiting examples include text, images, video, or a documents (e.g. word, excel, pdf, etc.).

At step 306, query engine 206 gathers the units of information required to fulfill the intent, from the knowledge base. At step 308, query engine 206 then composes a response using natural language processing and, if needed, images.

Figure 4:
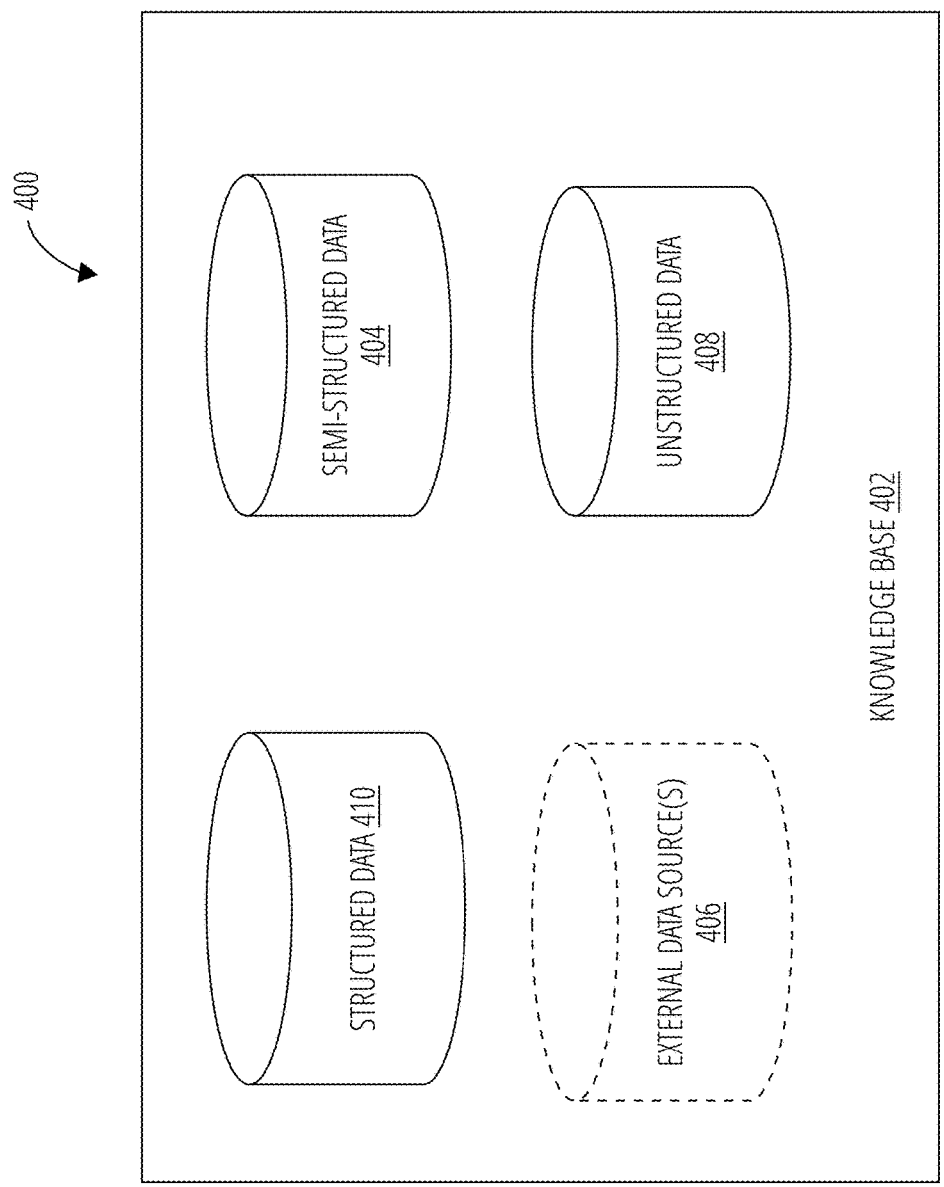
FIG. 4 illustrates a block diagram of a knowledge base in accordance with one embodiment.

FIG. 4 illustrates a block diagram 400 of a knowledge base 402 in accordance with one embodiment. As seen in FIG. 4, knowledge base 402 contains different types of data. As an example, there is structured data 410. This can include, for example, simple concepts stored in a table with headers such as concept and description; data model schemas and properties of the SaaS product; and structures to answer simple/common questions—for example: a UI tree that can be used to answer questions such as 'Where can I find scheduled tasks?' Another type of data stored in knowledge base 402 is semi-structured data 404. This can include, for example, help documents (i.e. documents that provide troubleshooting information, instruction manuals, and the like) stored in formats known in the art, such as JSON, HTML and XML. Yet another type of data stored in knowledge base 402 is also unstructured data 408. This can include, for example, raw documents such as user guides, FAQ (Frequent Asked Questions), troubleshooting documents, release notes or other documents.

In addition, knowledge base 402 can also use external data source(s) 406 to provide information related to the context of the product. This can include, for example, web services that provide information such as a thesaurus web service (to get synonyms to match similar words), or an industry dictionary service related to the product of the SAAS, in order to get common industry acronym definitions.

Figure 5:
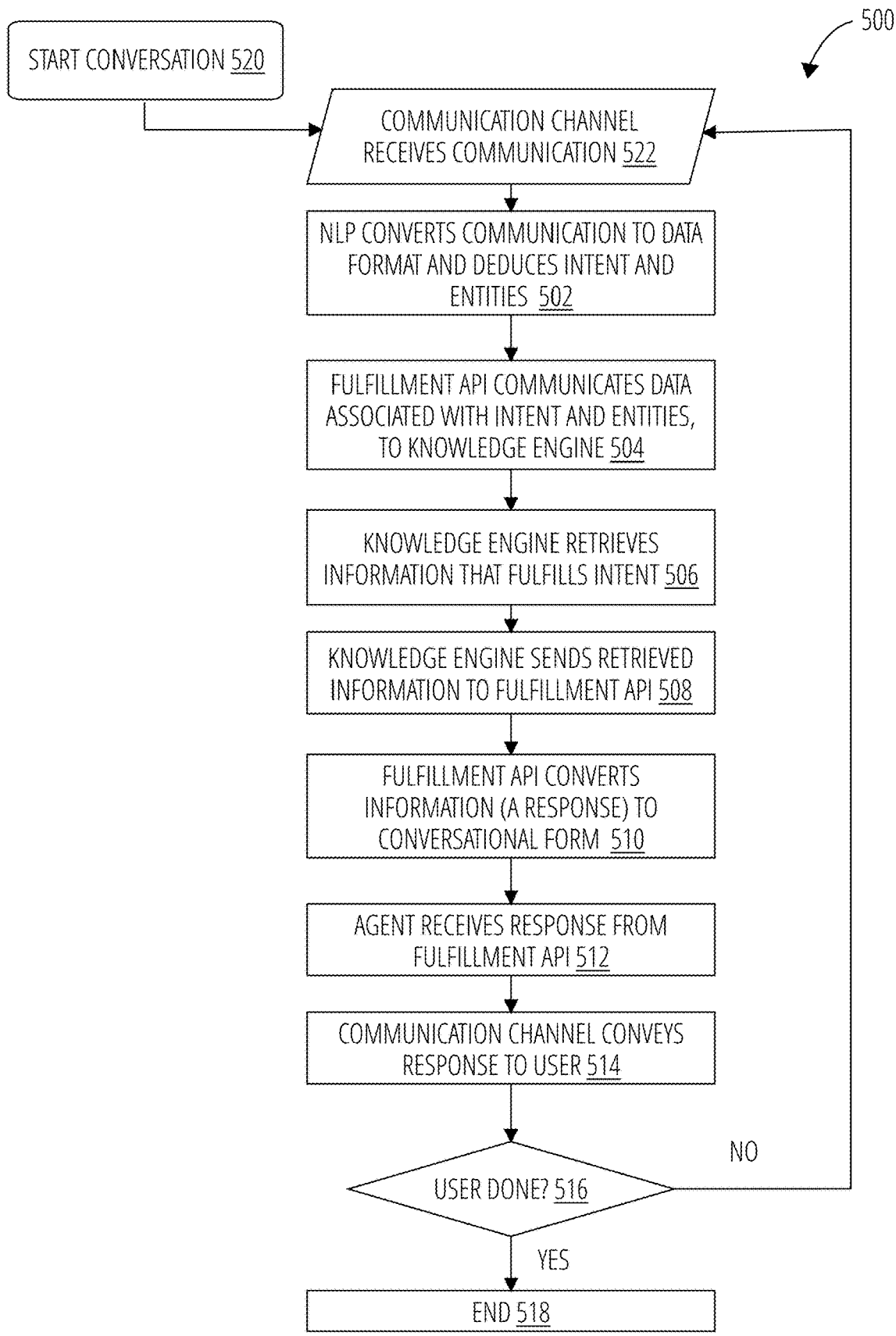
FIG. 5 illustrates a flowchart in accordance with one embodiment.

FIG. 5 illustrates a flowchart 500 in accordance with one embodiment.

At step 520, a user starts a conversation, either verbally or through text A communication channel receives the communication from the user at step 522. This communication is converted to data format via a NLP at step 502. At step 502, the NLP also deduces the intent and entities of the conversation. All of this information is sent to a fulfillment API, which communicates the data associated with the intent and entities to a knowledge engine at step 504. The knowledge engine then retrieves information that fulfills the intent at step 506. The knowledge engine sends the retrieved information back to the fulfillment API at step 508, which converts the information (i.e. response) into conversational form at step 510. The response is conveyed to the NLP at step 512, which is then conveyed to the user via the communication channel at step 514. At this point, if the user is satisfied with the answer and has no further questions (at decision block 516), the procedure ends at step 518. On the other hand, if the user still has another question at decision block 516, the method reverts back to step 522, and the entire procedure is repeated.

Figure 6:
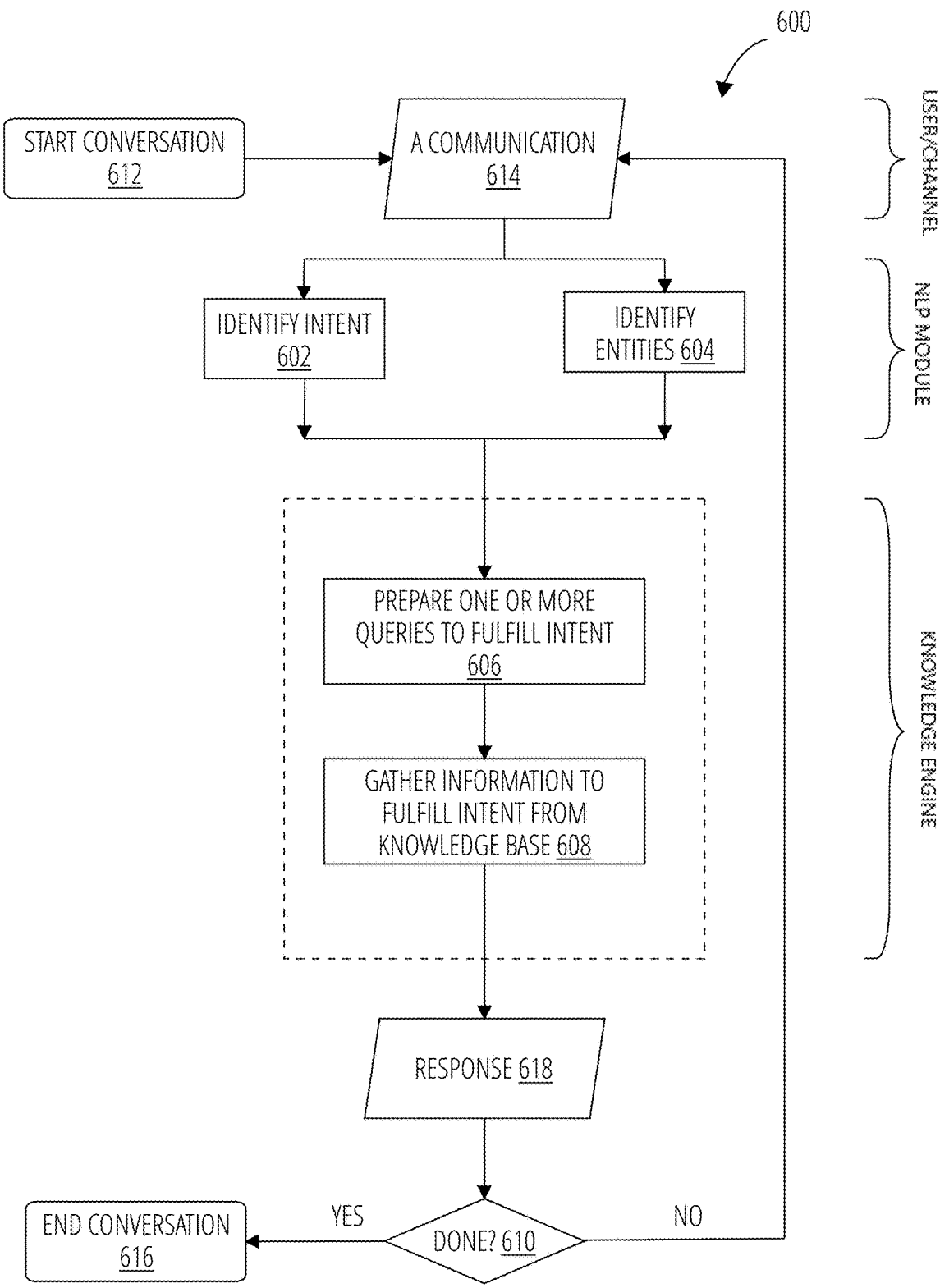
FIG. 6 illustrates a flowchart for obtaining information about a specific concept in accordance with one embodiment.

FIG. 6 illustrates a flowchart 600 for obtaining information about a specific concept in accordance with one embodiment.

A conversation is started at step 612. The communication channel receives the communication and converts it into a form that can be processed, at step 614, The NLP identifies the intent at step 602 and entities associated with the intent, at step 604. These are passed onto the knowledge engine, where one or more queries are prepared to fulfill the intent (deduced at step 602), at step 606. At step 608, information is gathered from the knowledge base in order to fulfill the intent. The information is then provided to the fulfillment API, and eventually conveyed to the user at step 618. If the user is done (decision block 610), then the conversation ends at step 616. However, if the user is not done (at decision block 610), then the program reverts to step 614 where a subsequent communication begins. An example of a conversation based on flowchart 600 is shown in FIG. 7.

FIG. 7 illustrates a conversation 700 in accordance with the embodiment shown in FIG. 6.

A user begins a conversation at 702. In this embodiment a Google™-based communication channel is being used. The user wishes to interact with a virtual agent (equivalent to virtual agent 106 in FIG. 1), referred to as "Kinaxis Brain™" at 702. The Google™-based assistant then turns to the virtual agent who is ready to assist in answering the user's question, at 704. The user asks a to know the definition of a specific concept at 706; namely, what is an "Independent Demand"—a concept related to supply-chain management in a SaaS product. The question posed by the user is answered at 708. The virtual agent is trained to ask a follow-up question at 708; namely, if there is any further question by the user. At 710, the user indicates satisfaction with the answer. The conversation ends at 712.

The conversation is a result of the procedure shown in FIG. 6. The intent and any associated entities are deduced by the NLP, based on the question asked by the user at 708. These are used to prepare one or more queries to fulfill the intent in the knowledge engine, which then retrieves the information from the knowledge base in order to fulfill the intent. This information, or response is then conveyed to the user via the fulfillment API, the NLP and the communication channel, at 708.

Figure 8:
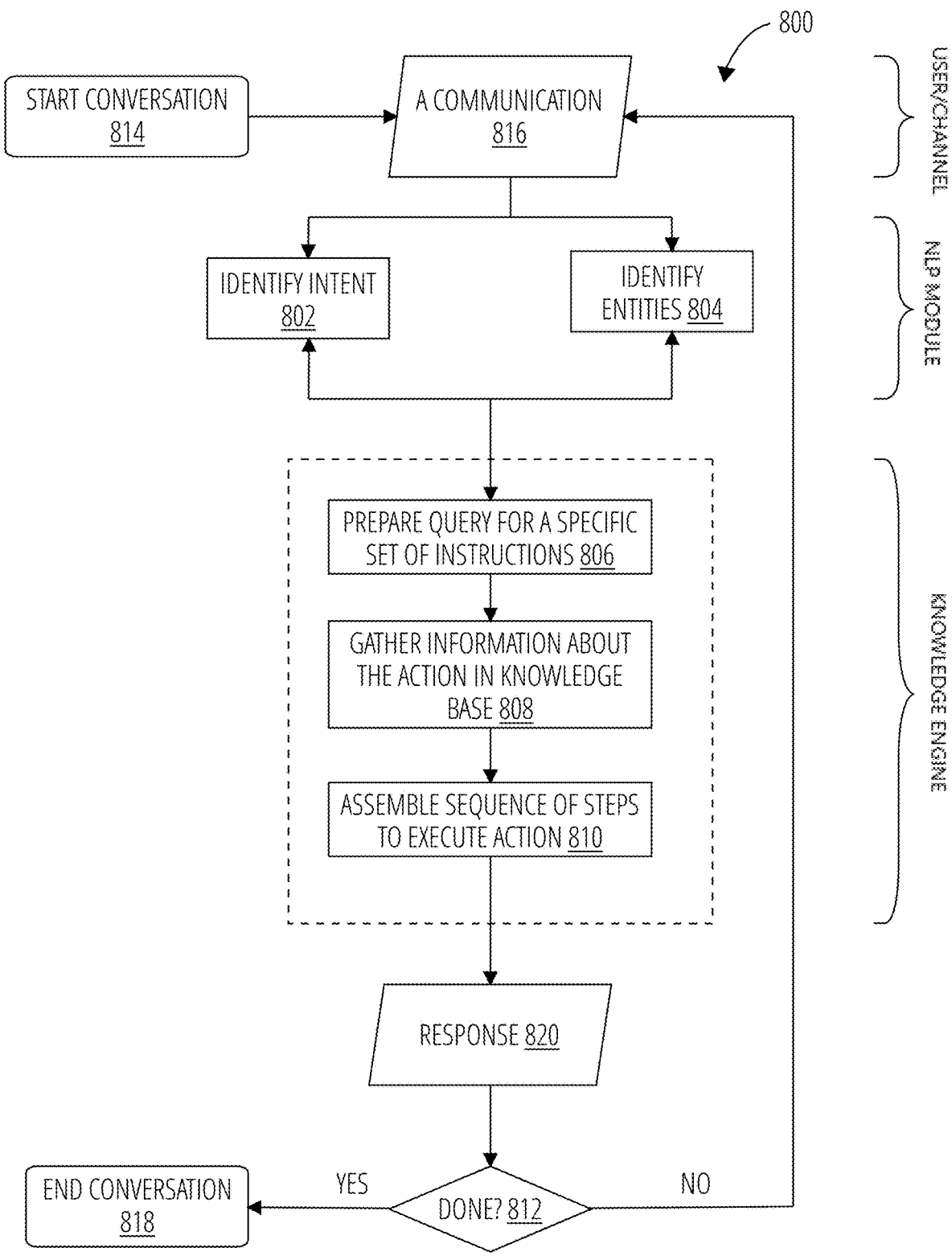
FIG. 8 illustrates a flowchart for obtaining a set of instructions in accordance with one embodiment.

FIG. 8 illustrates a flowchart 800 for obtaining a set of instructions in accordance with one embodiment.

A conversation is started at step 814. The communication channel receives the communication and converts it into a form that can be processed, at step 816, The NLP identifies the intent at step 802 and entities associated with the intent, at step 804. These are passed onto the knowledge engine, where a query is prepared for a specific set of instructions at step 806. At step 808, information is gathered about the action from the knowledge base. A sequence of steps required to execute the action is assembled at step 810. The response is then conveyed to the user via the fulfillment API, the NLP and the communication channel, at step 820 If the user is done (decision block 812), then the conversation ends at step 818. However, if the user is not done (at decision block 812), then the program reverts to step 816 where a subsequent communication begins. An example of a conversation based on flowchart 800 is shown in FIG. 9.

FIG. 9 illustrates a conversation 900 in accordance with the embodiment shown in FIG. 8.

A user begins a conversation at 902. In this embodiment a Google™-based communication channel is being used. The user wishes to interact with a virtual agent (equivalent to virtual agent 106 in FIG. 1), referred to as "Kinaxis Brain™" at 902. The Google™-based assistant then turns to the virtual agent who is ready to assist in answering the user's question, at 904. The user asks how to create a certain process at 906; namely, how to create a "collaboration"—a procedure related to supply-chain management in a SaaS product. The question posed by the user is answered at 908, in which a series of steps is provided. The virtual agent is trained to ask a follow-up question; namely, if there is any further question by the user. At 910, the user indicates satisfaction with the answer. The conversation ends at 912.

The conversation is a result of the procedure shown in FIG. 8. The intent and any associated entities are deduced by the NLP, based on the question asked by the user at 906. These are used to prepare a query for a specific set of instructions in the knowledge engine—namely, how to create a collaboration. Information about the action (i.e. creation of a collaboration) is gathered in the knowledge base, which then assembles a sequence of steps to execute the action. This information, or response is then conveyed to the user via the fulfillment API, the NLP and the communication channel, at 908.

Figure 10:
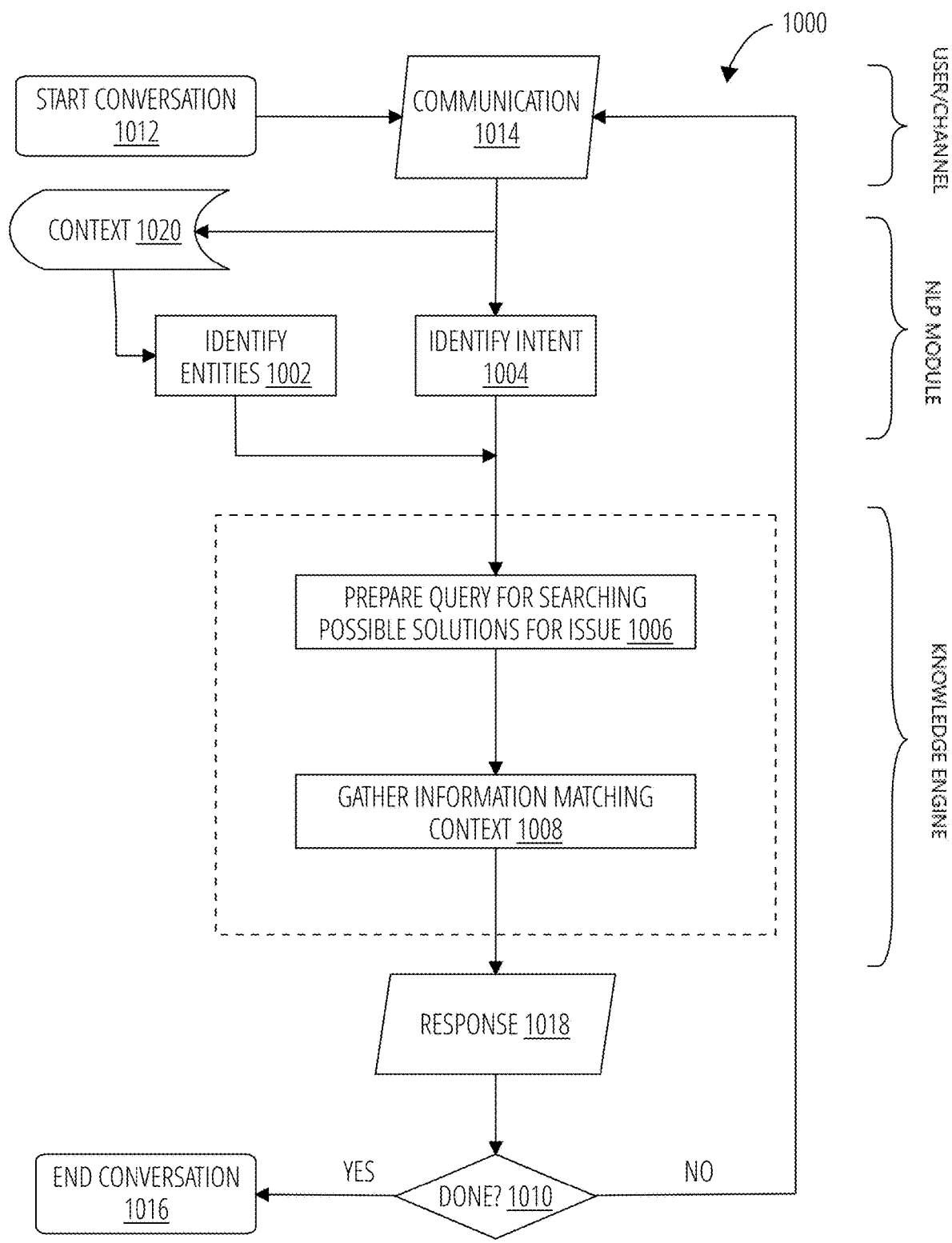
FIG. 10 illustrates a flowchart for helping a user troubleshoot an issue in accordance with one embodiment.

FIG. 10 illustrates a flowchart 1000 for helping a user troubleshoot an issue in accordance with one embodiment.

A conversation is started at step 1012. The communication channel receives the communication and converts it into a form that can be processed, at step 1014, The NLP identifies the intent at step 1004, as well as the context at step 1020. Entities are identified from the context at step 1002. The intent, context and entities are passed onto the knowledge engine, where a query is prepared for searching possible solutions for the issue associated with the conversation, at step 1006. At step 1008, information is gathered that matches the context, from the knowledge base. The response is then conveyed to the user via the fulfillment API, the NLP and the communication channel, at step 1018. If the user is done (decision block 1010), then the conversation ends at step 1016. However, if the user is not done (at decision block 1010), then the program reverts to step 1014 where a subsequent communication begins. An example of a conversation based on flowchart 1000 is shown in FIG. 11.

Figure 11:
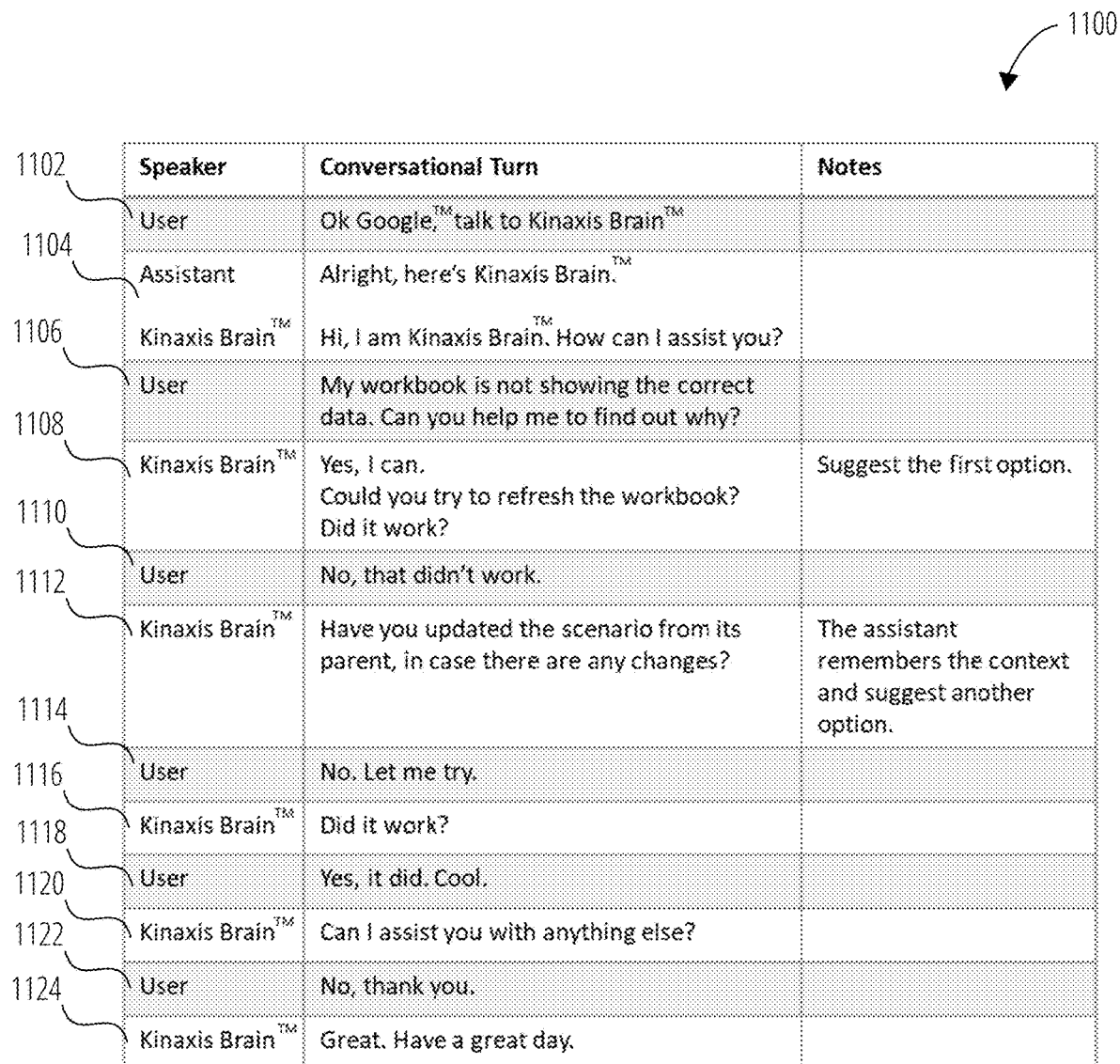
FIG. 11 illustrates a conversation in accordance with the embodiment shown in FIG. 10.

FIG. 11 illustrates a conversation 1100 in accordance with the embodiment shown in FIG. 10.

A user begins a conversation at 1102. In this embodiment a Google™-based communication channel is being used. The user wishes to interact with a virtual agent (equivalent to virtual agent 106 in FIG. 1), referred to as "Kinaxis Brain™" at 1102. Google™-based assistant then turns to the virtual agent who is ready to assist in answering the user's question, at 1104. The user asks for help in trouble shooting a workbook used in the SaaS, at 1106. The virtual agent suggests a first option at 1108—namely, trying to refresh the workbook, and then asks the user if the suggested action resolved the issue. At 1110, the user indicates that the suggested first option did not address the issue that had been raised at the outset of the conversation. The virtual agent remembers the context of the answer at 1110—namely that refreshing the workbook did not resolve the issue. At 1112, the virtual agent suggests a second action to resolve the issue—namely, updating a scenario from its parent. This option is related to the supply-chain management product that the user is using. At 1114, the user indicates that s/he will try the suggested action. At 1116, the virtual agent asks for confirmation if the second suggested option resolved the issue. At 1118, the user replies in the affirmative. The virtual agent is trained to ask a follow-up question; namely, if there is any further question by the user, at 1120. At 1122, the user indicates satisfaction with the answer. The conversation ends at 1124.

The conversation is a result of the procedure shown in FIG. 10. The intent, context and any associated entities are deduced by the NLP, based on the question asked by the user at 1106. These are used to prepare a query for a specific set of instructions searching for possible solutions for the issue raised by the user, in the knowledge engine—namely, how to troubleshoot a malfunctioning workbook. Information about the action (i.e. troubleshooting a workbook) that matches the context, is gathered in the knowledge base. A first response (or suggested action) is sent to the user via the fulfillment API, the NLP and the communication channel, at item 1108. Since the user is not satisfied (1110), the program reverts to a follow-up conversation (i.e. step 1014 in FIG. 10), which results in a second suggested action at 1112.

Figure 12:
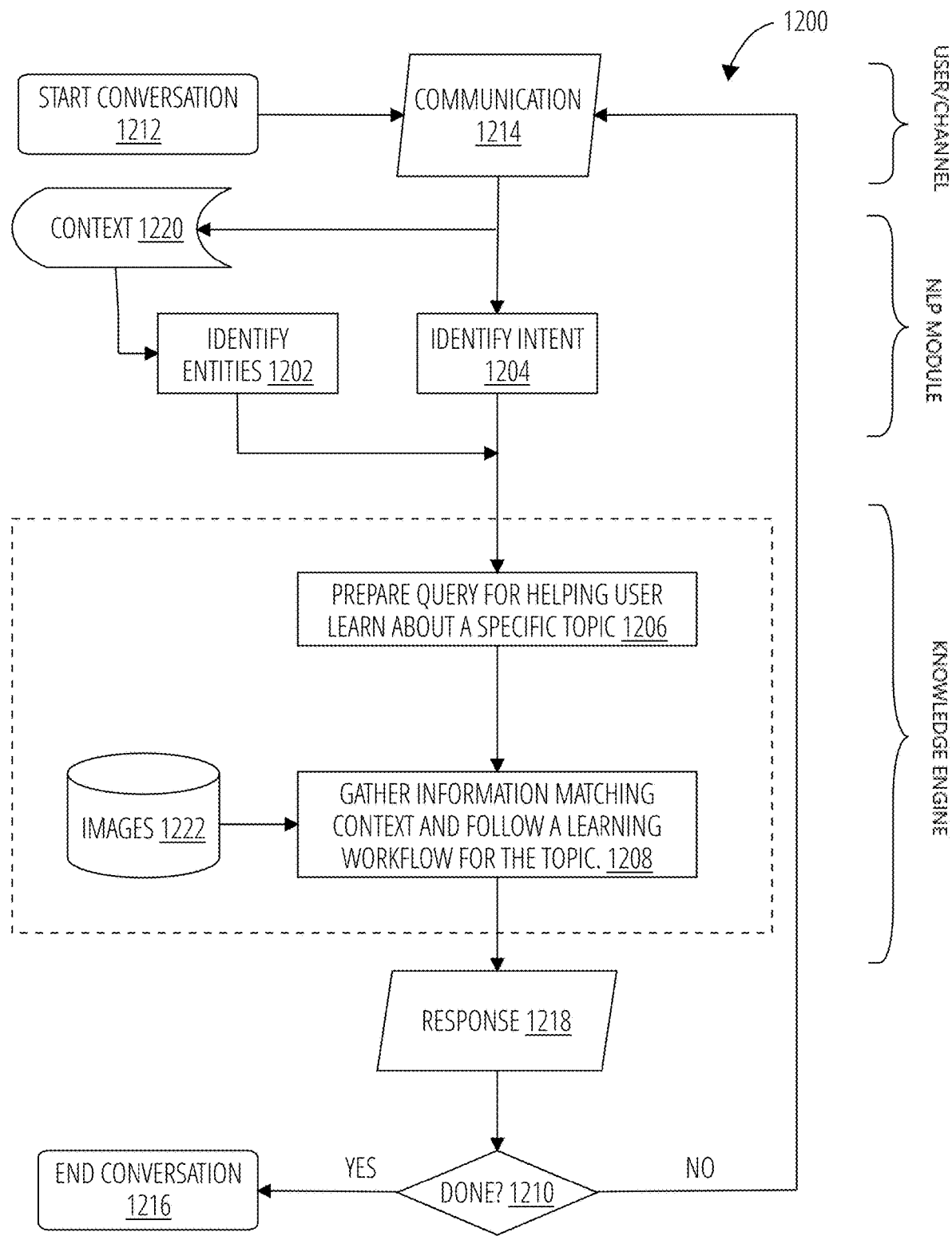
FIG. 12 illustrates a flowchart for guiding a user in accordance with one embodiment.

FIG. 12 illustrates a flowchart 1200 for guiding a user in accordance with one embodiment.

A conversation is started at step 1212. The communication channel receives the communication and converts it into a form that can be processed, at step 1214, The NLP identifies the intent at step 1204, as well as the context at step 1220. Entities are identified from the context at step 1202. The intent, context and entities are passed onto the knowledge engine, where a query is prepared for guiding a user to learn about a specific topic at step 1206. a user. At step 1208, information is gathered that matches the context and follows a learning workflow for the topic, from the knowledge base. This information can include images 1222 to be displayed to the user. The response is then conveyed to the user via the fulfillment API, the NLP and the communication channel, at step 1218. If the user is done (decision block 1210), then the conversation ends at step 1216. However, if the user is not done (at decision block 1210), then the program reverts to step 1214 where a subsequent communication begins. An example of a conversation based on flowchart 1200 is shown in FIG. 13.

FIG. 13 illustrates a conversation 1300 in accordance with the embodiment shown in FIG. 11.

A user begins a conversation at 1302. In this embodiment a Google™-based communication channel is being used. The user wishes to interact with a virtual agent (equivalent to virtual agent 106 in FIG. 1), referred to as "Kinaxis Brain™" at 1302. Google™-based assistant then turns to the virtual agent who is ready to assist in answering the user's question, at 1304. The user asks for guidance on how to view data in charts, based on the product, at 1306.

At 1308, the virtual agent provides a series of choices to the user at 1308—namely, viewing the charts in one of three ways: a dashboard, a workbook or a scorecard. At 1310, the user makes a selection (requests to see the data in a dashboard). The virtual agent remembers the context of the answer at 1310, and provides further choices (within the selected category of dashboards) at 1312. As part of the guidance provided to the user, one or more images (related to a dashboard and widgets) are shown to the user along with verbal commentary, in order to display the choices available to the user. Here, the user is given the choice of learning more about widgets or viewing data in dashboards.

At 1314, the user indicates that s/he makes a choice, based on the choices offered at 1312. The user chooses to learn more about viewing data on dashboards. At 1316, the virtual agent provides detailed guidance on viewing data in a dashboard, including an image of a tree map widget and source worksheet (particular to the product). At 1316, the virtual agent provides a further choice to the user if the user would like more detailed guidance with a question that requires a 'yes' or 'no' response. Here, the virtual agent asks the user if s/he would like to know about drilling from a widget. At 1318, the user replies in the affirmative would like to learn about drilling from a widget. At 1320, the virtual agent provides further information about drilling from a widget, including displaying images showing drilling examples.

The virtual agent is trained to ask a follow-up question; namely, if there is any further question by the user, at 1322. At 1324, the user indicates satisfaction with the answer. The conversation ends at 1326.

The conversation is a result of the procedure shown in FIG. 12. The intent, context and any associated entities are deduced by the NLP, based on the question asked by the user at 1306. These are used to prepare a query for a specific set of instructions searching for possible solutions for the issue raised by the user, in the knowledge engine—namely, guidance on how to view data in charts, Information about the action (i.e. guidance on how to view data in charts) that matches the context, is gathered in the knowledge base. A first response, that provides a list of options, is sent to the user via the fulfillment API, the NLP and communication channel, at item 1308. Once the user responds (at 1310), information regarding the context is gathered and a learning workflow for the topic is initiated (step 1208 in FIG. 12). This results in a series of dialogues between the virtual agent and the user at 1310 to 1324.

Figure 14:
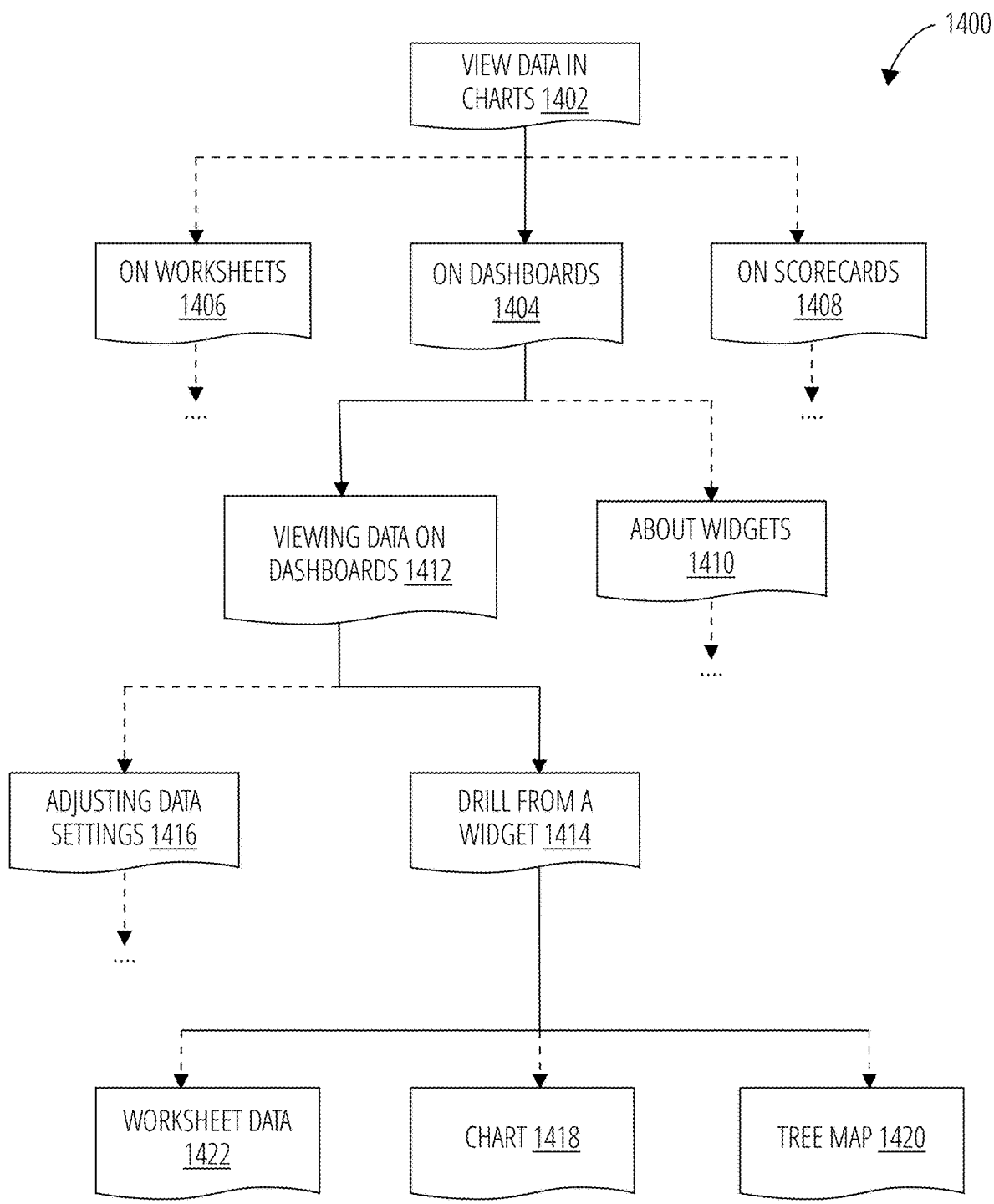
FIG. 14 illustrates a learning workflow in accordance with the embodiment shown in FIG. 13

FIG. 14 illustrates a learning workflow 1400 in accordance with the embodiment shown in FIG. 13.

When the user asks for help to view their data in charts (1306), this corresponds to item 1402 at the top of learning workflow 1400. According to learning workflow 1400, there are three ways that data can be viewed: on worksheets 1406, on dashboards 1404 or on scorecards 1408. The Agent conveys each of these three choices to the user at 1308 in conversation 1300. As seen in FIG. 14, each choice has its own set of branches.

In conversation 1300, the user has selected to view the data on dashboards 1404 (see 1310 in conversation 1300 for the user's response). According to learning workflow 1400, viewing data on dashboards 1404 can either provide information about widgets 1410, or about viewing data on dashboards 1412. The Agent conveys each of these two choices to the user at 1312 in conversation 1300, while displaying images of a dashboard and widgets. As seen in FIG. 14, each choice has its own set of branches.

In conversation 1300, the user has chosen to learn about viewing data on dashboards 1404 (see 1314 for the user's response). According to learning workflow 1400, viewing data on dashboards 1412 can either provide information about adjusting data settings 1416, or how to drill from a widget 1414. The Agent conveys each of these two choices to the user at 1316 in conversation 1300, while displaying images of a tree map widget and source worksheet. As seen in FIG. 14, each choice has its own set of branches.

In conversation 1300, the user has chosen to learn more on how to drill from a widget 1414 (see 1318 for the user's response). According to learning workflow 1400, the user can further learn about worksheet data 1422, a chart 1418 or a tree map 1420. The Agent conveys each of these three choices to the user at 1322 in conversation 1300, while displaying images of drilling examples. At this point, the user has declined to learn any further information, as evidenced by 1324 in conversation 1300.

Figure 15:
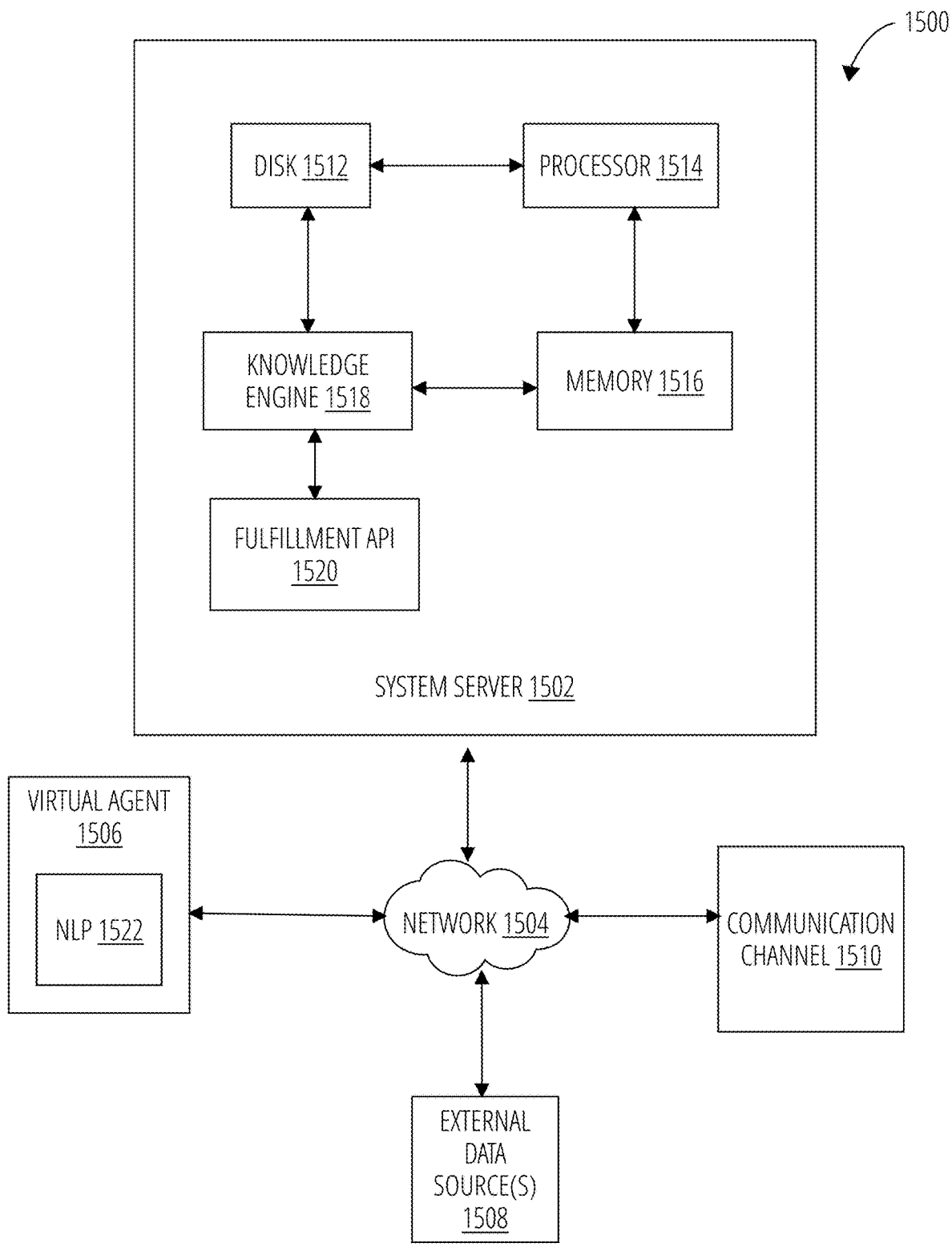
FIG. 15 illustrates an aspect of the subject matter in accordance with one embodiment.

FIG. 15 illustrates a system 1500 in accordance with one embodiment.

system 1500 includes a system server 1502, virtual agent 1506, communication channel 1510 and external data source(s) 1508. System server 1502 can include a memory 1516, a disk 1512, a processor 1514, a knowledge engine 1518 and a fulfillment API 1520. While one processor 1514 is shown, the system server 1502 can comprise one or more processors. In some embodiments, memory 1516 can be volatile memory, compared with disk 1512 which can be non-volatile memory. In some embodiments, system server 1502 communicates with virtual agent 1506, communication channel 1510 and external data source(s) 1508 via network 1504.

system 1500 can also include additional features and/or functionality. For example, system 1500 can also include additional storage (removable and/or non-removable) including, but not limited to, magnetic or optical disks or tape. Such additional storage is illustrated in FIG. 15 by memory 1516 and disk 1512. Storage media can include volatile and nonvolatile, removable and non-removable media implemented in any method or technology for storage of information such as computer-readable instructions, data structures, program modules or other data. Memory 1516 and disk 1512 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 1500. Any such non-transitory computer-readable storage media can be part of system 1500.

Communication between system server 1502, virtual agent 1506, communication channel 1510 and external data source(s) 1508 via network 1504 can be over various network types. Non-limiting example network types can include Fibre Channel, small computer system interface (SCSI), Bluetooth, Ethernet, Infrared Data Association (IrDA), Local area networks (LAN), Wireless Local area networks (WLAN), wide area networks (WAN) such as the Internet, serial, and universal serial bus (USB). Generally, communication between various components of system 1500 may take place over hard-wired, cellular, Wi-Fi or Bluetooth networked components or the like. In some embodiments, one or more electronic devices of system 1500 may include cloud-based features, such as cloud-based memory storage.

External data source(s) 1508 may include sources that provide information related to the context of the product. This can include, for example, web services that provide information such as a thesaurus web service (to get synonyms to match similar words), or an industry dictionary service related to the product, in order to get common industry acronym definitions.

Communication channel 1510 takes communication from a user and converts it into a form that can be processed by the virtual agent 1506. For example, if the user provides a verbal communication, communication channel 1510 converts the verbal form to text; if the user provides a textual communication, communication channel 1510 simply passes on the text to the virtual agent 1506. In some embodiments, the communication channel 1510 can include a communications application. The communication channel 1510 also returns information (i.e. a response) to the user. The response can be verbal, written or image-based. In some embodiments, the response can comprise a link to a video.

Virtual agent 1506 comprises a Natural Language Processor (NLP 1522). Virtual agent 1506 processes input provided by communication channel 1510. The NLP 1522 deduces an intent, and any entities associated with the intent. The NLP 1522 handles a conversation with a user and translates the end-user text into structured data, such that backend services can understand. The virtual agent 1506 and NLP 1522 are trained beforehand, in order to map intents and entities. Training is part of a standard procedure, and it is customized for a particular domain or application. Example of an NLP service that can be used include Google DialogFlow™; Microsoft™ Bot Service in combination with Microsoft Luis™; and Amazon Lex™.

The type of communication channel 1510 may depend on the service that is used to build the virtual agent 1506, For example, if DialogFlow™ (from Google™) is used to for both the virtual agent 1506 and NLP 1522, the communication channel 1510 can be Google™ Assistant (Google™ Home, Mini, Android™ and iPhone™ mobiles) and others. In another example, when Microsoft™ Bot Service is used for the virtual agent communication channel 104 and Microsoft™ Luis used for the NLP 1522, the channels can be Alexa™ Microsoft Cortana™, Facebook Messenger™, Kik™, and Slack™, as well as several others.

Using network 1504, system server 1502 can retrieve data from external data source(s) 1508. The retrieved data can be saved in memory 1516 or disk 1512. In some cases, system server 1502 can also comprise a web server, and can format resources into a format suitable to be displayed on a web browser.

The fulfillment API 1520 subsequently communicates data associated with the intent and entities to a knowledge engine 1518, which receives the intent and obtains the information to fulfill the intent. Once the fulfillment API 1520 receives the information from the knowledge engine 1518, the fulfillment API 1520 returns the retrieved information to the virtual agent 1506 via network 1504. The fulfillment API 108 is constructed according to methods known in the art. In some embodiments, a webhook is built using any programming language to build an HTTP Web API, such as Python, Java, C#, etc.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for obtaining a set of instructions on how to use a product, the method comprising:
    receiving, by a communication channel, a communication from a user, the communication comprising a request for obtaining the set of instructions;
    receiving, by a virtual agent, the communication from the communication channel, the virtual agent comprising a natural language processor;
    deducing, by the natural language processor, an intent and one or more entities of the communication, the natural language processor having been trained on: one or more sets of sample phrases with each set of sample phrases associated with a respective intent, and a definition of each entity;
    communicating, by a fulfillment API, the intent and the one or more entities to a knowledge engine;
    preparing, by the knowledge engine, a query for the set of instructions;
    gathering, by the knowledge engine, information about an action associated with the set of instructions;
    assembling, by the knowledge engine, a sequence of steps to execute the action;
    communicating, by the knowledge engine, the sequence of steps to the fulfillment API;
    converting, by the fulfillment API, the sequence of steps into a response;
    conveying, by the virtual agent, the response from the fulfilment API to the communication channel; and
    communicating, by the communication channel, the response to the user;
    wherein the communication channel depends on a service that is used in construction of the virtual agent.

2. The computer-implemented method of claim 1, wherein:
    the knowledge engine comprises a knowledge base that provides information about the product; and
    the knowledge base comprises structured data, semi-structured data, unstructured data and communication with one or more external data sources.

3. The computer-implemented method of claim 1, wherein the response comprises at least one of an image, a video, a text and a document.

4. The computer-implemented method of claim 1, wherein the communication is at least one of, a text-based communication, a verbal communication and an image-based communication.

5. The method of claim 1, further comprising:
    upon receiving no follow-up response from the user to the response to the user, conveying, by the virtual agent, a question from the fulfillment API to the communication channel, the question comprising a request for confirmation that the sequence of steps has fulfilled the request for the set of instructions.

6. A system for obtaining a first set of instructions on how to use a product, the system comprising:
    a processor; and a memory storing a second set of instructions that, when executed by the processor, configure the system to:
  receive, by a communication channel, a communication from a user, the communication comprising a request for obtaining the first set of instructions;
  receive, by a virtual agent, the communication from the communication channel, the virtual agent comprising a natural language processor;
  deduce, by the natural language processor, an intent and one or more entities of the communication, the natural language processor having been trained on: one or more sets of sample phrases with each set of sample phrases associated with a respective intent, and a definition of each entity;
  communicate, by a fulfillment API, the intent and the one or more entities to a knowledge engine;
  prepare, by the knowledge engine, a query for the first set of instructions;
  gather, by the knowledge engine, information about an action associated with the first set of instructions;
  assemble, by the knowledge engine, a sequence of steps to execute the action;
  communicate, by the knowledge engine, the sequence of steps to the fulfillment API;
  convert, by the fulfillment API, the sequence of steps into a response;
  convey, by the virtual agent, the response from the fulfilment API to the communication channel; and
  communicate, by the communication channel, the response to the user;
  wherein the communication channel depends on a service that is used in construction of the virtual agent.

7. The system of claim 6, wherein:
the knowledge engine comprises a knowledge base that provides information about the product; and
the knowledge base comprises structured data, semi-structured data, unstructured data and communication with one or more external data sources.

8. The system of claim 6, wherein the response comprises at least one of an image, a video, a text and a document.

9. The system of claim 6, wherein the communication is at least one of a text-based communication, a verbal communication and an image-based communication.

10. The system of claim 6, wherein the second set of instructions that, when executed by the processor, further configure the system to:
  convey, by the virtual agent, a question from the fulfillment API to the communication channel upon receiving no follow-up response from the user to the response to the user, the question comprising a request for confirmation that the sequence of steps has fulfilled the request for the first set of instructions.

11. A non-transitory computer-readable storage medium for obtaining a first set of instructions on how to use to a product, the computer-readable storage medium including a second set of instructions that when executed by a computer, configure the computer to:
  receive, by a communication channel, a communication from a user, the communication comprising a request for obtaining the first set of instructions;
  receive, by a virtual agent, the communication from the communication channel, the virtual agent comprising a natural language processor;
  deduce, by the natural language processor, an intent and one or more entities of the communication, the natural language processor having been trained on: one or more sets of sample phrases with each set of sample phrases associated with a respective intent, and a definition of each entity;
  communicate, by a fulfillment API, the intent and the one or more entities to a knowledge engine;
  prepare, by the knowledge engine, a query for the first set of instructions;
  gather, by the knowledge engine, information about an action associated with the first set of instructions;
  assemble, by the knowledge engine, a sequence of steps to execute the action;
  communicate, by the knowledge engine, the sequence of steps to the fulfillment API;
  convert, by the fulfillment API, the sequence of steps into a response;
  convey, by the virtual agent, the response from the fulfilment API to the communication channel; and
  communicate, by the communication channel, the response to the user;
  wherein the communication channel depends on a service that is used in construction of the virtual agent.

12. The non-transitory computer-readable storage medium of claim 11, wherein:
the knowledge engine comprises a knowledge base that provides information about the product; and
the knowledge base comprises structured data, semi-structured data, unstructured data and communication with one or more external data sources.

13. The non-transitory computer-readable storage medium of claim 11, wherein the response comprises at least one of an image, a video, a text and a document.

14. The non-transitory computer-readable storage medium of claim 11, wherein the second set of instructions, that when executed by a computer, configure the computer to:
  convey, by the virtual agent, a question from the fulfillment API to the communication channel upon receiving no follow-up response from the user to the response to the user, the question comprising a request for confirmation that the sequence of steps has fulfilled the request for the first set of instructions.

15. The non-transitory computer-readable storage medium of claim 11, wherein the communication is at least one of a text-based communication, a verbal communication and an image-based communication.

* * * * *